(12) United States Patent
Li

(10) Patent No.: US 11,785,148 B2
(45) Date of Patent: Oct. 10, 2023

(54) DATA TRANSMISSION CONTROL METHOD, INFORMATION SENDING END AND RECEIVING END AND AERIAL VEHICLE IMAGE TRANSMISSION SYSTEM

(71) Applicant: AUTEL ROBOTICS CO., LTD., Guangdong (CN)

(72) Inventor: Zhaozao Li, Guangdong (CN)

(73) Assignee: AUTEL ROBOTICS CO., LTD., Guangdong (CN)

(*) Notice: Subject to any disclaimer, the term of this patent is extended or adjusted under 35 U.S.C. 154(b) by 334 days.

(21) Appl. No.: 17/126,345

(22) Filed: Dec. 18, 2020

(65) Prior Publication Data
US 2021/0105367 A1 Apr. 8, 2021

Related U.S. Application Data

(63) Continuation of application No. PCT/CN2019/091753, filed on Jun. 18, 2019.

(30) Foreign Application Priority Data

Jun. 21, 2018 (CN) .......................... 201810645607.3

(51) Int. Cl.
*H04N 21/6373* (2011.01)
*H04N 21/6375* (2011.01)
(Continued)

(52) U.S. Cl.
CPC ....... *H04N 1/00095* (2013.01); *H04L 1/1809* (2013.01); *H04N 1/00204* (2013.01); *H04N 2201/0094* (2013.01)

(58) Field of Classification Search
USPC .............. 358/1.1–3.29, 1.11–1.18, 400–439; 348/14.12–22, 555–569
See application file for complete search history.

(56) References Cited

U.S. PATENT DOCUMENTS

| 6,629,261 B1* | 9/2003 | Chintada ............... H04L 1/1809 |
| | | 714/704 |
| 6,728,410 B1* | 4/2004 | Fukunaga ............... G06T 9/007 |
| | | 375/240.03 |

(Continued)

FOREIGN PATENT DOCUMENTS

| CN | 1764184 A | 4/2006 |
| CN | 101919212 A | 12/2010 |

(Continued)

OTHER PUBLICATIONS

CN101690078, Appleby, Stephen;Bandwidth Allocation Control in Multi-video Streaming Transmission, Mar. 31, 2010 (Year: 2010).*

(Continued)

*Primary Examiner* — Marcellus J Augustin

(57) ABSTRACT

The present invention relates to a data transmission control method, an information sending end and receiving end, and an aerial vehicle image transmission system. The data transmission control method includes: receiving data frames sent by a sending end, the data frames being sequentially sent by the sending end in an order of a data frame sequence; and returning an acknowledgement signal corresponding to a currently-received data frame N to the sending end, to enable the information sending end to determine a current network status according to the acknowledgement signal, and adjusting data encoding quality of the sent data frame based on the current network status. In the method, delays for image quality and transmission speed to recover when a network status recovers can be effectively reduced by rapidly determining a current network status based on the feedback of an acknowledgement signal.

17 Claims, 6 Drawing Sheets

(51) Int. Cl.
*H04N 1/00* (2006.01)
*H04L 1/1809* (2023.01)

(56) References Cited

U.S. PATENT DOCUMENTS

| | | | | |
|---|---|---|---|---|
| 8,964,115 | B2* | 2/2015 | Eggert | H04L 65/752 |
| | | | | 714/790 |
| 9,462,305 | B2* | 10/2016 | Van Zijst | H04L 61/00 |
| 9,769,527 | B2* | 9/2017 | Frusina | H04N 21/278 |
| 10,681,382 | B1* | 6/2020 | Brailovskiy | H04N 19/159 |
| 2002/0075893 | A1* | 6/2002 | Gipson | H04W 16/12 |
| | | | | 370/458 |
| 2005/0259577 | A1* | 11/2005 | Sin | H04W 8/04 |
| | | | | 370/310 |
| 2006/0114830 | A1* | 6/2006 | Shimonishi | H04L 69/16 |
| | | | | 370/241 |
| 2010/0302359 | A1* | 12/2010 | Adams | H04N 7/185 |
| | | | | 375/240.01 |
| 2014/0281707 | A1 | 9/2014 | Su et al. | |

FOREIGN PATENT DOCUMENTS

| | | | |
|---|---|---|---|
| CN | 102449977 | A | 5/2012 |
| CN | 104767591 | A | 7/2015 |
| CN | 105191184 | A | 12/2015 |
| CN | 105898403 | A | 8/2016 |
| CN | 106792263 | A | 5/2017 |
| CN | 108769450 | A | 11/2018 |

OTHER PUBLICATIONS

CN102299899, Song, Si-ming; A TCP Acceleration Method in Bad Channel; Dec. 28, 2011 (Year: 2011).*
CN105376172, Ni, Hua-rong; A Method for Controlling Network Congestion, Mar. 2, 2016 (Year: 2016).*
PCT International Search Report PCT/CN2019/091753.
Chinese Office Action Application No. 2019032701963130; dated Apr. 1, 2019.

* cited by examiner

DATA TRANSMISSION CONTROL METHOD, INFORMATION SENDING END AND RECEIVING END AND AERIAL VEHICLE IMAGE TRANSMISSION SYSTEM

This application is a continuation application of International Application No. PCT/CN2019/091753, filed on Jun. 18, 2019, which claims priority of Chinese Patent Application No. 201810645607.3, filed on Jun. 21, 2018, which is incorporated herein by reference in its entirely.

BACKGROUND

Technical Field

The present invention relates to the field of data transmission technologies, and in particular, to a data transmission control method, an information sending end and receiving end and an aerial vehicle image transmission system.

Related Art

Unmanned aerial vehicles (UAVs) are photographing vehicles that grow increasingly popular in recent years. Based on the high maneuverability and flexible position movement of UAVs or aerial vehicles, many angles that are impossible for normal photography can be obtained. Therefore, UAVs are increasingly applied to aerial photography.

A user usually uses an application (APP) installed on a smart mobile terminal or another dedicated display device to play, on demand in real time, images photographed by an aerial photography UAV, so as to implement photographing control on the aerial photography of the UAV. To support such a real-time image on-demand function, it is necessary to establish a wireless communication channel between the UAV and a user terminal, so as to transmit image data to the user terminal.

However, in this case, a wireless communication network in the air is often susceptible to interference, resulting in network fluctuation. Moreover, when the UAV and the user terminal are far apart, the network bandwidth is significantly reduced. For these reasons, a real-time video stream accumulates to cause phenomena such as delay and network packet loss, resulting in problems such as screen corruption.

How to rapidly adapt to network changes during image transmission to provide a real-time video in a poor network environment as much as possible or to provide a video image with optimal quality as soon as the network is recovered is a problem to be resolved urgently.

SUMMARY

To resolve the foregoing technical problem, embodiments of the present invention provide a data transmission control method, an information sending end and receiving end and an aerial vehicle image transmission system that can rapidly adapt to changes in a network environment.

To resolve the foregoing technical problem, the embodiments of the present invention provide the following technical solutions: A data transmission control method is provided. The data transmission control method includes:

receiving data frames sent by a sending end, the data frames being sequentially sent by the sending end in an order of a data frame sequence; and returning an acknowledgement signal corresponding to a currently-received data frame N to the sending end, to enable the information sending end to determine a current network status according to the acknowledgement signal, and adjust data encoding quality of the sent data frame based on the current network status.

Optionally, the data frame sequence is divided into a plurality of non-critical segments by a plurality of critical frames; and the method further includes: determining whether there is a lost data frame between the currently-received data frame N and a previously-received data frame N−1, N being a positive integer greater than 1;

decoding the data frame N in a case that there is no lost data frame; and discarding, in a case that there is a lost data frame, the data frame N and a non-critical frame segment at which the data frame N is located.

Optionally, a time length of the non-critical segment is less than a preset time threshold.

Optionally, the data frame has a sequence number that increases by frame with a sending order of the data frame sequence; and the determining whether there is a lost data frame between the currently-received data frame N and a previously-received data frame N−1 specifically includes:

determining whether sequence numbers of the currently-received data frame N and the previously-received data frame N−1 are consecutive; determining, in a case that the sequence numbers are consecutive, that there is no lost data frame; and determining, in a case that the sequence numbers are not consecutive, that there is a lost data frame.

Optionally, the discarding, in a case that there is a lost data frame, the data frame N and a non-critical frame segment at which the data frame N is located specifically includes:

discarding the data frame N in a case that there is a lost data frame; determining whether a next-received data frame N+1 is a critical frame; decoding, in a case that the data frame N+1 is a critical frame, the critical frame; and discarding the data frame N+1 in a case that the data frame N+1 is not a critical frame; and repeating the step of determining whether a next-received data frame N+1 is a critical frame after the data frame N+1 is discarded.

To resolve the foregoing technical problem, the embodiments of the present invention further provide the following technical solutions: A data transmission control method is provided. The data transmission control method includes: sequentially sending data frames to a receiving end in an order of a data frame sequence; receiving an acknowledgement signal from the receiving end; determining a current network status according to the acknowledgement signal; and adjusting data encoding quality of the sent data frame based on the current network status.

Optionally, the determining a current network status according to the acknowledgement signal specifically includes: determining, within a preset time period, whether a corresponding acknowledgement signal is received after the data frame is sent; and determining a current network status according to a receiving result of the corresponding acknowledgement signal.

Optionally, the data frame has a sequence number that increases by frame with a sending order; and the acknowledgement signal includes a sequence number of the data frame received by the information receiving end; and the determining, within a preset time period, whether a corresponding acknowledgement signal is received after the data frame is sent includes: determining, within the preset time period, whether an acknowledgement signal is received after the data frame is sent;

determining, in a case that an acknowledgement signal is received, whether the sequence number included in the sent data frame is the same as the sequence number in the acknowledgement signal;

determining, in a case that the sequence number included in the sent data frame is the same as the sequence number in the acknowledgement signal, that the corresponding acknowledgement signal is received; and determining, in a case that the sequence number included in the sent data frame is different from the sequence number in the acknowledgement signal, that the corresponding acknowledgement signal is not received.

Optionally, the preset time period includes at least two receiving cycles.

Optionally, the determining a current network status according to a receiving result of the corresponding acknowledgement signal includes: increasing, in a case that the corresponding acknowledgement signal is not received, a statistical value used for representing a network congestion degree; resetting or decreasing the statistical value in a case that the corresponding acknowledgement signal is received; and determining the current network status according to the statistical value.

Optionally, the determining the current network status according to the statistical value specifically includes: determining, in a case that the statistical value is greater than a preset congestion threshold, that the network status is a congestion state; and determining, in a case that the statistical value is less than a preset normal threshold, that the network status is a normal state.

Optionally, the adjusting data encoding quality of the sent data frame based on the current network status specifically includes: lowering the data encoding quality in a case that the current network status is a congestion state; and stepwise recovering the data encoding quality in a case that the current network status is a normal state.

Optionally, the lowering the data encoding quality in a case that the current network status is a congestion state includes: lowering the data encoding quality according to a size relationship between the statistical value and the congestion threshold.

Optionally, the lowering the data encoding quality in a case that the current network status is a congestion state specifically includes: lowering a grade of the data encoding quality in a case that the statistical value is greater than a preset first congestion threshold, the data encoding quality being divided into a plurality of grades.

Optionally, the method further includes: lowering the data encoding quality to the lowest grade in a case that the statistical value is greater than a preset second congestion threshold, the second congestion threshold being greater than the first congestion threshold.

Optionally, the method further includes: clearing non-critical segments in a cache queue, the non-critical segments being segments divided from the data frame sequence by the critical frame.

Optionally, the method further includes: clearing all to-be-sent data frames in the cache queue in a case that the statistical value is greater than a preset third congestion threshold, the third congestion threshold being greater than the second congestion threshold.

Optionally, the stepwise recovering the data encoding quality in a case that the current network status is a normal state specifically includes: calculating a count that the statistical value is consecutively less than the preset normal threshold; and improving the grade of the data encoding quality in a case that the count is greater than a preset count threshold. the data encoding quality is classified into a plurality of grades.

Optionally, the method further includes: resetting the count after the grade of the data encoding quality is improved.

To resolve the foregoing technical problem, the embodiments of the present invention further provide the following technical solutions: An information sending end is provided.

The information sending end includes a communication interface, a processor and a memory, the communication interface, the processor and the memory being coupled, where the processor is configured to encode acquired image information, to form encoded information;

the memory at least includes a data cache region and a software application (APP) storage region, the data cache region being used for caching the encoded information and forming a cache sequence, the software APP storage region storing a software APP; and the processor calls the software APP to perform the data transmission control method described above to send the encoded information to an information receiving end through the communication interface in a form of a data frame.

To resolve the foregoing technical problem, the embodiments of the present invention further provide the following technical solutions: An information receiving end is provided. The information receiving end includes a communication interface, a processor and a memory, the communication interface, the processor and the memory being coupled, where the processor is configured to encode acquired image information, to form encoded information;

the memory at least includes a data cache region and a software application (APP) storage region, the data cache region being used for caching the encoded information and forming a cache sequence, the software APP storage region storing a software APP; and the processor calls the software APP to perform the data transmission control method described above to send the encoded information to an information receiving end through the communication interface in a form of a data frame.

To resolve the foregoing technical problem, the embodiments of the present invention further provide the following technical solutions:

An aerial vehicle image transmission system is provided. The aerial vehicle image transmission system includes an information sending end and an information receiving end, where the information receiving end is configured to perform the data transmission control method described above to receive data frames from the information sending end; and the information sending end is configured to: acquire image information, and perform the data transmission control method described above to send the data frames to the information receiving end.

Compared with the prior art, according to the data transmission control method provided in the embodiments of the present invention, problems such as screen corruption and lack of image that occur in a poor network status may be resolved in a manner of discarding appropriate data frames at a receiving end.

Further, delays for image quality and transmission speed to recover when a network status recovers can be effectively reduced based on the feedback of an acknowledgement signal at the sending end, thereby enabling the image quality to recover quickly.

BRIEF DESCRIPTION OF THE DRAWINGS

One or more embodiments are described by way of example with reference to the corresponding figures in the accompanying drawings, and the exemplary descriptions do not constitute a limitation on the embodiments. Elements in the accompanying drawings having same reference numerals are represented as similar elements, and unless otherwise particularly stated, the figures in the accompanying drawings are not drawn to scale.

DETAILED DESCRIPTION

To facilitate the understanding of the present invention, the present invention is described below in more detail with reference to the accompanying drawings and specific embodiments. It should be noted that, when an element is described to be "fixed to" another element, the element may be directly fixed on the another element, or there may be one or more intermediate elements therebetween. When an element is described to be "connected to" another element, the element may be directly connected to the another element, or there may be one or more intermediate elements therebetween. In the description of this specification, orientation or position relationships indicated by the terms such as "up", "down", "inside", "outside" and "bottom" are based on orientation or position relationships shown in the accompanying drawings, and are used only for ease and brevity of illustration and description of the present invention, rather than indicating or implying that the mentioned apparatus or component needs to have a particular orientation or needs to be constructed and operated in a particular orientation. Therefore, such terms should not be construed as limiting of the present invention. In addition, terms "first", "second" and "third" are only used to describe the objective and cannot be understood as indicating or implying relative importance.

Unless otherwise defined, meanings of all technical and scientific terms used in the present invention are the same as that usually understood by a person skilled in the technical field to which the present disclosure belongs. In the present invention, terms used in the specification of the present invention are merely intended to describe objectives of the specific embodiments, but are not intended to limit the present invention. A term "and/or" used in the present invention includes any or all combinations of one or more related listed items.

In addition, the technical features involved in the different embodiments of the present invention described below may be combined with each other so long as they do not constitute a conflict with each other.

Figure 1:
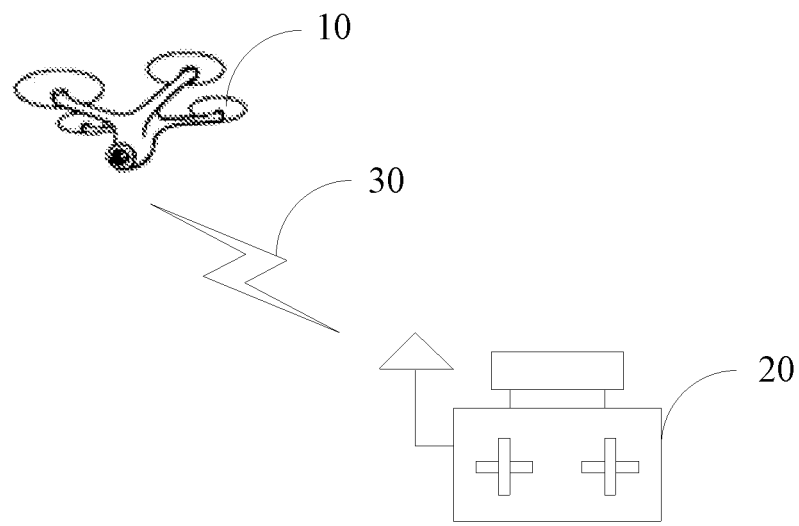
FIG. 1 is a schematic diagram of an application environment according to an embodiment of the present invention.

FIG. 1 shows an application environment according to an embodiment of the present invention. As shown in FIG. 1, the application environment includes a UAV 10, a user terminal 20 and a wireless network 30.

The UAV 10 may be an aerial vehicle driven by any type of power, and includes, but not limited to, a multi-rotor UAV, for example, a quadrotor UAV, a fixed-wing UAV and a helicopter. In this embodiment, the quadrotor UAV is used as an example for description.

The UAV 10 may have a corresponding volume or power according to actual requirements, so as to provide sufficient loading capacity, flight speed, flight mileage, and the like. One or more functional modules may further be added to the UAV to enable the UAV to implement more functions.

For example, in some embodiments, the UAV 10 has at least one image acquisition device for acquiring image information. In some other embodiments, the UAV 10 may further provide a fixing support for fixedly mounting the image acquisition device, so as to a enable user to change the image acquisition device mounted on the UAV 10 as required.

The user terminal 20 may be a user interaction device of any type. The user terminal 20 may be equipped with one or more types of different user interaction devices configured to acquire a user instruction or present or feed back information to the users. These interaction devices include, but are not limited to, a button, a display screen, a touch screen, a loudspeaker and a remote control lever. For example, the user terminal 20 may be equipped with a touch display screen, and receive a touch instruction of the user through the touch display screen and present image information to the user through the touch display screen.

In some embodiments, the user terminal 20 may be a smart terminal device. The user terminal 20 may be equipped with a software APP matching the UAV 10. The user may obtain, by using the software APP, the image information acquired by the UAV 10.

In some other embodiments, the user terminal 20 may further be a dedicated control device supporting the UAV 10, for example, a remote control of the UAV. The user terminal may receive image information from the UAV 10 and display the image information through a built-in or externally-connected display screen.

Figure 2:
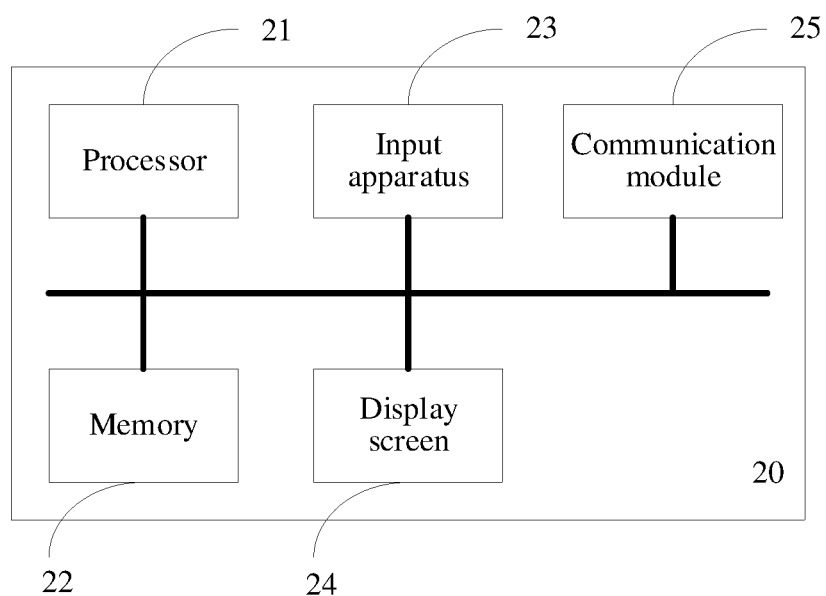
FIG. 2 is a structural block diagram of a user terminal according to an embodiment of the present invention.

FIG. 2 is a structural block diagram of a user terminal 20 according to an embodiment of the present invention. As shown in FIG. 2, the user terminal 20 may include a processor 21, a memory 22, an input apparatus 23, a display screen 24 and a communication module 25.

A communication connection is established between any two of the processor 21, the memory 22, the input apparatus 23, the display screen 24 and the communication module 25 through a bus or in another connection manner.

The processor 21 is any type of single-thread or multi-thread processor with one or more processing cores. As a control core of the user terminal 20, the processor is configured to: obtain data, perform logic computation functions, and issue a computation processing result.

The memory 22 is a nonvolatile computer readable storage medium, for example, at least one magnetic disk storage device, a flash memory, a distributed storage device remotely disposed relative to the processor 21 or another nonvolatile solid-state storage device.

The memory 22 may have a program storage region configured to store a non-transitory software program and a non-transitory computer-executable program and a module, to be called by the processor 21 to enable the processor 21 to perform one or more method steps. The memory 22 may further have a data storage region, configured to store the computation processing result issued and outputted by the processor 21.

The input apparatus 23 is a user interaction device configured to acquire an input instruction of the user, for example, a mouse, a keyboard, a touch panel or another input device. The input apparatus 23 receives information such as numbers or characters inputted by the user, and provides the information to the processor 21 to enable the processor 21 to execute a corresponding control instruction.

The display screen 24 is a display device configured to present corresponding data to the user in a specific form, and may be a display of any type, for example, a LED display, a picture tube display or an LCD display. The display screen 24 receives display information outputted by the processor 21, and correspondingly converts the display information into image information to provide the image information to the user.

The communication module 25 is a functional module configured to establish a communication connection with the UAV 10 to provide a physical channel. The communication module 25 may be a wired or wireless communication module of any type, for example, a Wi-Fi module or a Bluetooth module. The communication module 25 may include an antenna or another apparatus, which is not described in detail herein.

The wireless network 30 may be a wireless communication network that can establish a data transmission channel between two nodes based on a data transmission principle of any type, for example, a Bluetooth network, a Wi-Fi network, a wireless cellular network, and a combination of a plurality of wireless communication networks that are located at different signal frequency bands.

In some embodiments, the wireless network 30 may be a radio frequency (RF) transmission network with a frequency band of 2.4 GHz. The UAV 10 and the user terminal 20 are provided with corresponding RF modules, to establish a corresponding communication link to implement data transmission between the UAV 10 and the user terminal 20.

Figure 3:
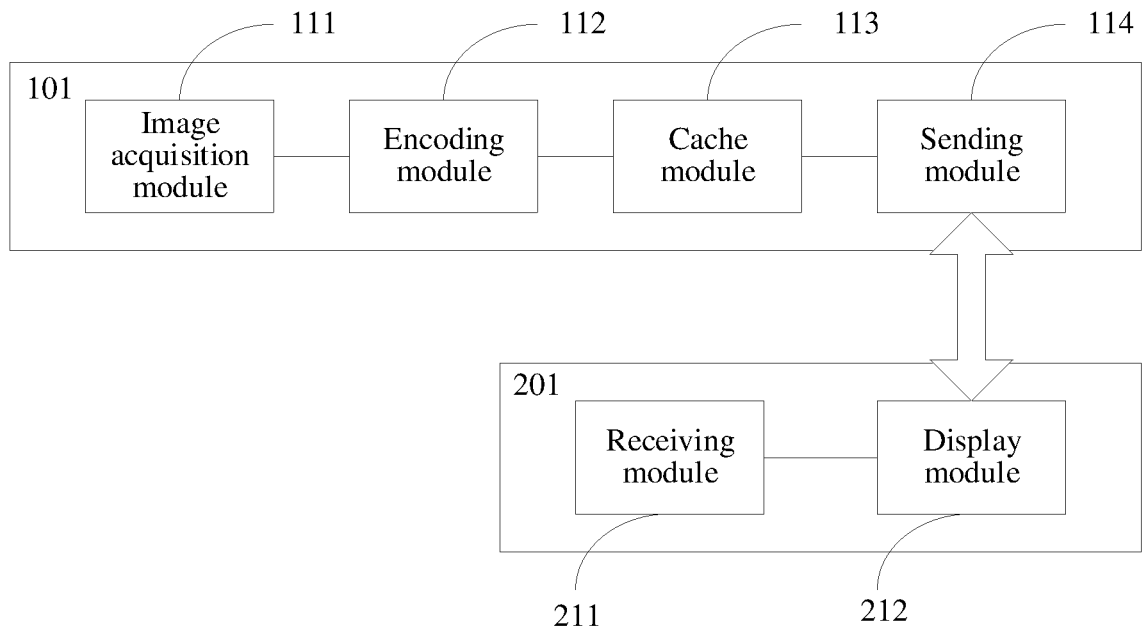
FIG. 3 is a structural block diagram of an aerial vehicle image transmission system according to an embodiment of the present invention.

FIG. 3 shows an aerial vehicle image transmission system according to an embodiment of the present invention. The aerial vehicle image transmission system may be applied to the application environment shown in FIG. 1, to implement real-time image information transmission between the UAV 10 and the user terminal 20.

In this embodiment, the aerial vehicle image transmission system includes an information sending end 101 applied to the UAV 10 and an information receiving end 201 applied to the user terminal 20.

The information sending end 101 sends a series of data frames to the information receiving end 21 through an RF communication network of 2.4 GHz or 5.2 GHz or any other RF communication network. The information receiving end 201 returns a receiving status of the data frame to the information sending end through a corresponding RF communication network.

The information receiving end 201 and the information sending end 101 exchange data with each other based on the RF communication network of 2.4 GHz or 5.2 GHz or any other RF communication network, and determine a state of the current RF communication network of 2.4 GHz according to the exchanged data, and adaptively adjust a manner of sending a data frame or decoding a data frame, so as to ensure the stable running of the aerial vehicle image transmission system.

Specifically, as shown in FIG. 3, the information sending end 101 specifically includes the following hardware modules: an image acquisition module 111, an encoding module 112, a cache module 113 and a sending module 114. In this embodiment, the hardware modules shown in FIG. 3 are classified according to the performed functions. As known to a person skilled in the art, the hardware modules may be specifically integrated into an electronic computation circuit formed by a processor, a memory and a communication interface for implementation. A communication interface in this embodiment of the present application may be understood as the foregoing communication module.

The image acquisition module 111 is a photographing device mounted outside the UAV or inside the UAV, and is configured to acquire image information of different angles or different positions in an automatic or controlled manner. According to different acquisition and photographing devices, acquired original image information may have corresponding information formats.

In some embodiments, the image acquisition module 111 may be alternatively omitted, and the information sending end 101 only receives image data information from the network or another source. Herein, the image acquisition module 111 is only configured to represent an image information source. The image information source is not included in the limited scope of the present invention. The present invention is only used to receive image information to perform a corresponding image transmission method.

The encoding module 112 is a functional circuit that is connected to the image acquisition module 111 to receive original image information acquired by the image acquisition module 111. The encoding module 112 may be implemented by selecting a graphic encoding chip or an encoding circuit of any type.

The encoding module 112 may adopt various different types of encoding manners according to actual requirements to encode the original image information and compress the original image information into image information that is easy to be transmitted via RF. Herein, the "data encoding quality" is used to represent a compression degree of the original image information after encoding, and may be configured to adjust an amount of data that needs to be sent and image quality.

When the data encoding quality is relatively high, it represents that more original image information is recorded, and image display quality is relatively high. Correspondingly, an amount of data that needs to be sent and loaded is relatively large. When the data encoding quality is relatively low, it represents that more original image information is compressed, and image display quality decreases. However, the amount of data that needs to be sent and loaded decreases accordingly.

The cache module 113 may adopt a variety of different data storage circuits or memories. The cache module 113 may be integrated with the encoding module 112 into the same control circuit board, to provide the encoding module 112 with a cache function.

The cache module 113 is connected to the encoding module 112, to receive and temporarily store the encoded data outputted by the encoding module 112, and functions as a data buffer region between the encoding module 112 and the sending module 114. In some embodiments, the cache module 113 adopts a data storage manner in a first-in first-out (FIFO) form. In the cache module 113, to-be-sent data is arranged to form a cache queue and should be taken out and sent in order.

The sending module 114 is a core part of the whole information sending end, and may include an RF antenna and a corresponding supporting circuit, to load the encoded information into an RF carrier signal and send the RF carrier signal in a form of data frames. The sending module 114 may adopt an RF antenna of any type and a corresponding peripheral circuit, to send the data frames.

As the information sending end sends the data frames, a wireless RF network may encounter temporary network congestion due to an excessively large distance, an interference source, shielding or other problems. The sending module 114 may adopt the method shown in FIG. 4 to adjust a sending strategy of the image data frames in time when the network is in a congestion state, so as to ensure the stability of the aerial vehicle image transmission system.

Figure 4:
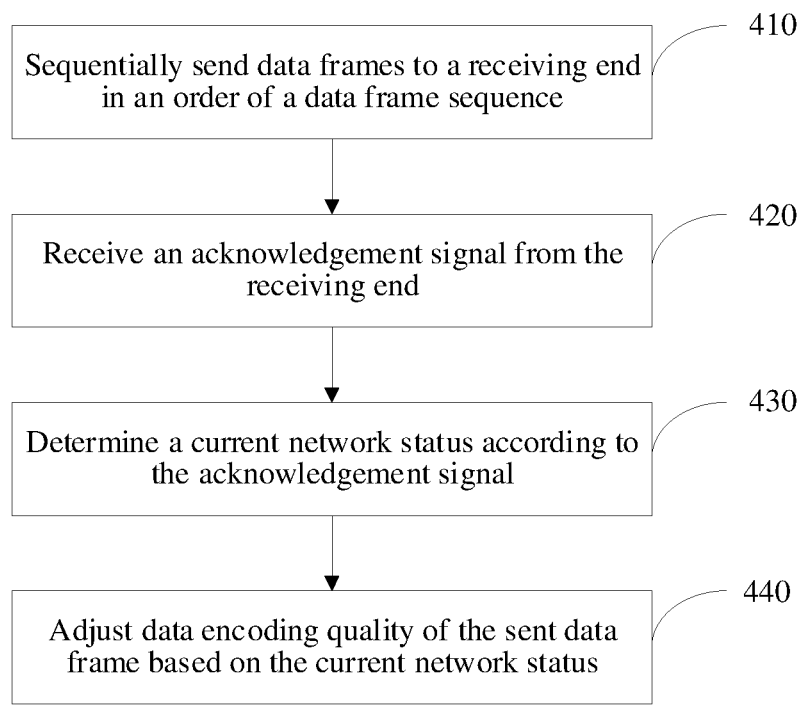
FIG. 4 is a method flowchart of a data transmission control method performed by an information sending end according to an embodiment of the present invention.

FIG. 4 shows a data transmission control method according to an embodiment of the present invention. In this embodiment, the data transmission control method is applicable to an information sending end of an aerial vehicle image transmission system. A person skilled in the art may understand that, based on the same inventive concept, the data transmission control method may further be applicable to other wireless transmission processes of data of other different types (for example, audio transmission), and is not limited to the aerial vehicle image transmission system.

As shown in FIG. 4, the data transmission control method includes the following steps.

410. Sequentially send data frames to a receiving end in an order of a data frame sequence.

In this embodiment, video image data acquired by an image acquisition apparatus is represented by using a data frame sequence formed by a plurality of data frames arranged in order. The sending module 114 sequentially sends the data frames to the information receiving end in an order of the data frames acquired by the image acquisition apparatus.

In the aerial vehicle image transmission system, a process of sequentially sending the data frames by the sending module 114 is a real-time and continuous process. However, after the image information acquired by the image acquisition module 111 is encoded by the encoding module 112, the encoded data may be cached in the cache module 113 to form a cache queue, and is sequentially taken out and sent by the sending module 114 according to a FIFO principle.

During the sending of a data frame, a specific identification used to represent the data frame is usually written into a packet header of the data frame, to implement packet loss detection and other functions. In some embodiments, when sending a data frame, the sending module 114 may write a sequence number that increases by frame with a sending order of the data frame sequence in a packet header of the data frame or a corresponding data region. That is, the sequence numbers are a data frame 1, a data frame 2, . . . , and a data frame n.

In some embodiments, the data frame sequence may be cut and divided into a plurality of different non-critical frame segments by a plurality of critical frames. That is, in the data frame sequence, a critical frame may occur in every specific duration, and frames between two critical frames are all non-critical frames.

The critical frame is a data frame that changes significantly or obviously in a consecutive data frame sequence. The non-critical frame is a data frame that changes slightly relative to a previous data frame in a consecutive data frame sequence.

In a process of acquiring images by the image acquisition module 111, data frames acquired within a relatively short time have a small difference in time. Therefore, it may be considered that the data frames have similar content.

In some embodiments, based on the foregoing assumption, the time interval may be used as a distinguishing standard of the critical frame and the non-critical frame. That is, a critical frame is set every preset duration or preset quantity of non-critical frames. For example, at least one critical frame is set every second.

420. Receive an acknowledgement signal from the receiving end.

The acknowledgement signal is an acknowledgement signal returned to the signal sending end after the signal receiving end receives the data frame. It may be set according to actual cases that the acknowledgement signal includes one or more types of information used for reflecting a receiving status of the data frame, for example, an identification of the received data frame or a hardware number of the signal receiving end.

430. Determine a current network status according to the acknowledgement signal.

The acknowledgement signal may reflect a receiving status of the signal receiving end in a process of receiving the data frames. Therefore, the signal sending end may determine a current network status of the wireless network in combination with the data frames sent by the signal sending end.

The network status may be evaluated through one or more types of different measurement standards. The specific selected measurement standards may be determined by a technician according to actual cases.

In some embodiments, the network status may be generally classified into a congestion state or a normal state according to a transmission success rate of a data frame. The transmission success rate of the data frame is determined according to whether the acknowledgement signal conforms to the sent data frame.

440. Adjust data encoding quality of the sent data frame based on the current network status.

The acknowledgement signal reflects whether the sent data can be successfully received. Therefore, in some embodiments, the information sending end may determine, within a preset time period, whether a corresponding acknowledgement signal is received after the data frame is sent; and determine a current network status according to a receiving result of the corresponding acknowledgement signal.

For different network statuses, the sending module 114 may correspondingly adjust a strategy or focus of sending data frames to meet requirements of a user in different network statuses.

For example, in a poor network status (for example, a congestion state), a user needs to keep image transmission uninterrupted or to recover interrupted image transmission in time. Therefore, the sending module 114 may ensure that the image transmission can be implemented in a low-bandwidth state in a manner of lowering image transmission quality, that is, lowering data encoding quality of data frames.

Alternatively, in a better network status (for example, a normal state), a user wants to obtain higher image quality or picture quality in this case. Therefore, the sending module 114 may improve the data encoding quality, so as to provide the user with images of higher quality as much as possible.

In the UAV image transmission system, the wireless network has an unstable network status and is prone to repeated or instantaneous changes. Therefore, to avoid a problem that the network status deteriorates again and then enters a vicious circle due to the excessive pressure of data transmission after the network status recovers slightly, in some embodiments, the sending module 114 may adopt a manner of stepwise recovering the data encoding quality, to gradually improve the data encoding quality.

The manner of stepwise recovering is to gradually improve the data encoding quality as the network status keeps improving in an interval between the highest data encoding quality and the lowest data encoding quality that are supported by the encoding module 113.

Figure 5:
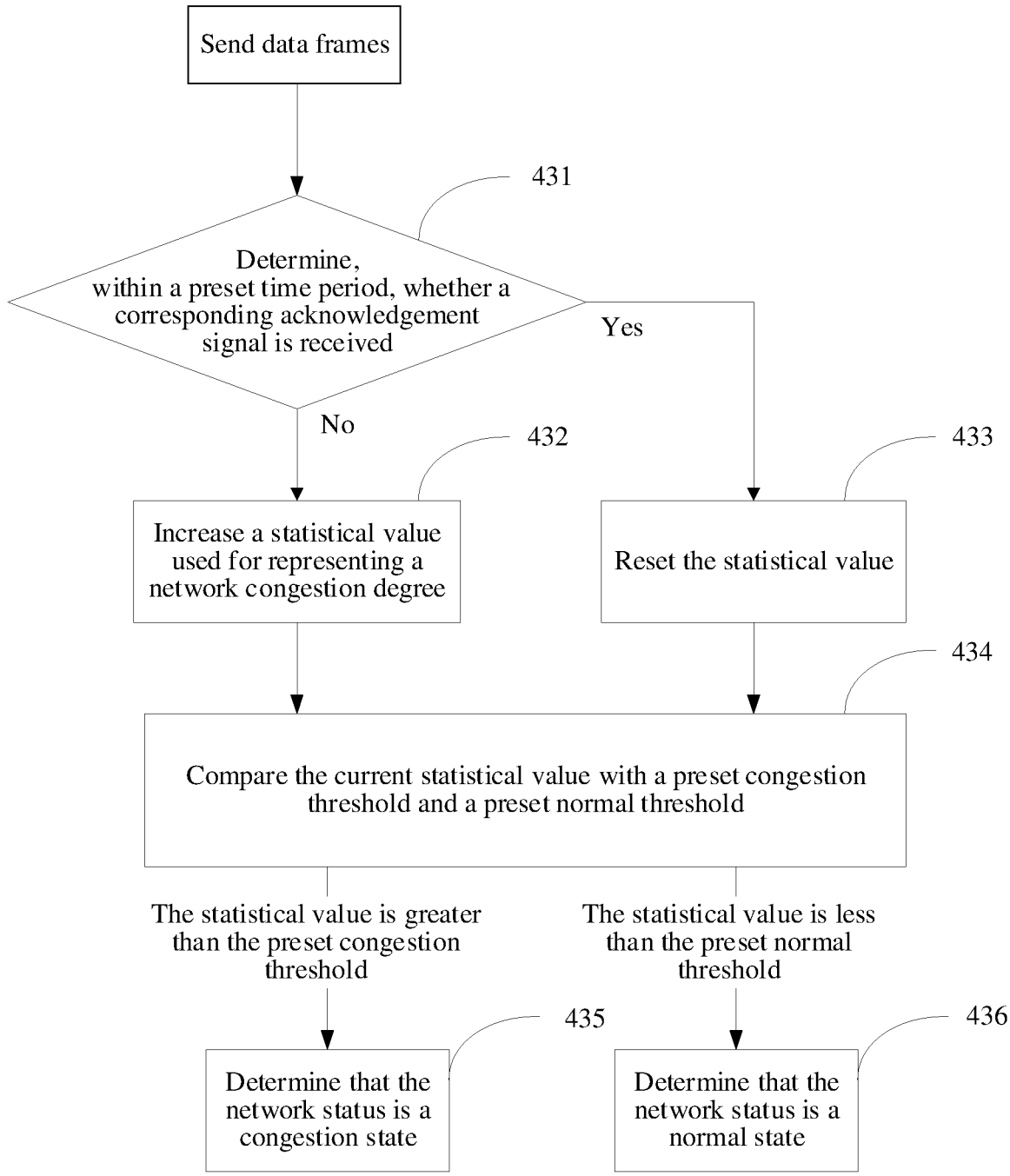
FIG. 5 is a method flowchart of step 430 shown in FIG. 4.

FIG. 5 is a method flowchart of determining a network status according to an acknowledgement signal according to an embodiment of the present invention. Based on the method provided in FIG. 5, a corresponding manner may be adopted to adjust the data encoding quality of the sent data frame to adapt to changes of the network status.

As shown in FIG. 5, the method for determining the network status according to the acknowledgement signal includes the following steps.

431. Determine, within a preset time period, whether a corresponding acknowledgement signal is received after the data frame is sent. Step 432 is performed in a case that the corresponding acknowledgement signal is not received; and step 433 is performed in a case that the corresponding acknowledgement signal is received.

The preset time period is detection duration set according to an actual use status or requirement, and is duration required for the signal receiving end to return the acknowledgement signal in general. The preset time period may adopt a plurality of different manners. For example, the preset time period may be represented through a particular quantity of times of wait duration.

In some embodiments, unit wait duration (that is, the receiving cycle) of 5 milliseconds may be set. The preset time period may be set to twice the unit wait duration (that is, two receiving cycles). Certainly, more unit wait durations, for example, three times or four times, may be set according to actual requirements (for example, a delay between the data frame and the acknowledgement signal is relatively long). Certainly, the preset time period or the unit wait duration needs to be set properly to avoid misjudgments.

The "corresponding acknowledgement signal" is acknowledgement information that is returned by the signal receiving end to the signal sending end and acknowledges that the data frame sent by the signal sending end is received. Specifically, the acknowledgement information may use the sequence number in the foregoing method embodiment to determine whether the signal receiving end receives the sent data frame. That is, the data frame has a sequence number that increases by frame with a sending order; and the acknowledgement signal includes a sequence number of the data frame received by the information receiving end.

First, after receiving the data frame, the signal receiving end reads the sequence number of the received data frame, writes the sequence number into acknowledgement information, and sends the acknowledgement information to the signal sending end immediately. Next, the signal sending end determines, within the preset time period, whether the sequence number in the received acknowledgement signal is the same as the sequence number of the sent data frame. In a case that the sequence number in the received acknowledgement signal is the same as the sequence number of the sent data frame, it is determined that the corresponding acknowledgement signal is received. In a case that the sequence number in the received acknowledgement signal is different from the sequence number of the sent data frame, it is determined that the corresponding acknowledgement signal is not received.

432. Increase a statistical value used for representing a network congestion degree.

In this embodiment, there are two cases that the corresponding acknowledgement signal is not received. In one case, the acknowledgement signal is not received. In the other case, the acknowledgement signal is received, but the sequence number of the acknowledgement signal is different from the sequence number of the sent data frame.

In both the cases, it represents that the sent data frame is not received by the signal receiving end, and packet loss of a data frame occurs. This is a negative signal. Therefore, when this case occurs, a data value of the statistical value may be increased by 1, to represent that the degree of network congestion increases.

433. Reset or decrease the statistical value.

As mentioned above, when the corresponding acknowledgement signal is received, it indicates that the sent data frame does not encounter a phenomenon of frame loss and can be transmitted to the signal receiving end successfully. This is a positive signal. Therefore, the statistical value may be reset or decreased in this case, and the current status of the wireless network may be detected again.

The statistical value determined based on calculation may be used for calculating or determining a current network status. Specifically, the following step 434 may be performed.

434. Compare the current statistical value with a preset congestion threshold and a preset normal threshold. Step 435 is performed in case that the statistical value is greater than the preset congestion threshold; and step 436 is performed in case that the statistical value is less than the preset normal threshold.

435. Determine that the network status is a congestion state.

The congestion threshold is a manually set value, and may be determined by a technician according to historical empirical data or an actual use status. The congestion state is a state that a very small amount of data can be transmitted in the current network status (that is, the available bandwidth is low) and therefore the network status is severely affected. Therefore, in the congestion state, the load of data transmission of the wireless network needs to be reduced or decreased.

436. Determine that the network status is a normal state.

Similar to the congestion threshold, the normal threshold is also a manually set value used for determining whether the current network status is a normal state. The normal threshold is obtained by a technician through empirical analysis, and is related to an actual service environment of the aerial vehicle image transmission system. In the normal state, the network status of the wireless network is relatively adequate, and can provide image transmission of higher quality.

Based on the statistical value used in the method for determining a network status disclosed in the foregoing embodiments, the embodiments of the present invention further provide a specific method of lowering data transmission quality and recovering data transmission quality. When the network status is a congestion state, the data encoding quality is lowered according to a size relationship between the statistical value and the congestion threshold. The size relationship between the statistical value and the congestion threshold indicates a congestion severity of the network status.

Figure 6:
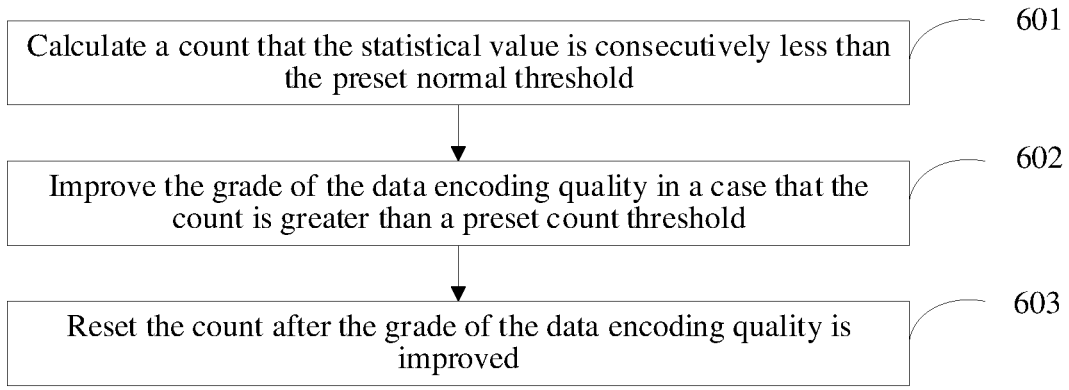
FIG. 6 is a method flowchart of stepwise recovering data transmission quality according to an embodiment of the present invention.

FIG. 6 is a method flowchart of stepwise recovering data transmission quality according to an embodiment of the present invention. In this embodiment, to implement stepwise recovery, the data encoding quality may be divided into Q+1 grades, represented as a quality grade 0, a quality grade 1, a quality grade 2, . . . , and a quality grade Q in ascending order of quality. In a case that the network status meets the requirement, one data encoding quality grade is improved once with the change of the network status and with a unit of grade, so as to implement stepwise recovery. A quantity of the set quality grades may be set according to actual cases, for example, to 5, 10 or 15. Certainly, when the quantity of the divided quality grades is larger, stepwise recovery is smoother, and better recovery is implemented.

In this embodiment, as shown in FIG. 6, the method includes the following steps.

601. Calculate a count that the statistical value is consecutively less than the preset normal threshold.

In the method embodiment shown in FIG. 5, every time after sending a data frame, the information sending end updates and determines the statistical value once according to whether there is an acknowledgement signal corresponding to the data frame. A comparison between the updated statistical value and the normal threshold is recorded as one in the count. In other words, in step 601, the count uses the sending of a data frame as a unit of calculation.

602. Improve the grade of the data encoding quality in a case that the count is greater than a preset count threshold.

When the count value is larger, the network status is kept at the normal state for a longer time, and the network status is more likely to be actually recovered. Therefore, the technician may set an appropriate count threshold according to an actual network status. Certainly, the count threshold should be set to a relatively large value as much as possible, to avoid a problem that the current network status cannot be accurately reflected and the normal transmission of the image data is affected due to fluctuation or vibration when the threshold is excessively small.

603. Reset the count after the grade of the data encoding quality is improved.

Every time after the grade of the data encoding quality is improved, the count is reset and step 601 to step 603 are repeated, until the grade of the data encoding quality is improved to the highest grade level.

In such a manner, the data encoding quality can be gradually improved stepwise along with the change status of the network status, so that the recovery speed of the data encoding quality from a low-bandwidth network to a normal network is effectively improved. At the same time, an actual condition of the network status can be identified, thereby avoiding a vibration phenomenon and a vicious circle in image transmission.

Figure 7:
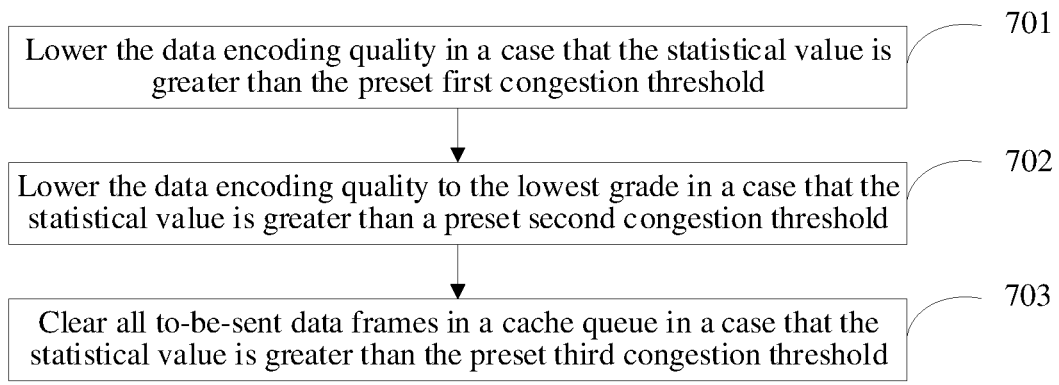
FIG. 7 is a method flowchart of lowering data transmission quality according to an embodiment of the present invention.

FIG. 7 is a method flowchart of lowering data transmission quality according to an embodiment of the present invention. In this embodiment, a plurality of different congestion thresholds are set, and the congestion state is divided into a plurality of different grades. Moreover, corresponding measures are adopted to lower the data encoding quality, so as to better adapt to different network statuses.

Schematically, three different congestion thresholds, namely, a first congestion threshold, a second congestion threshold and a third congestion threshold, may be set, and the congestion state is classified into three types.

701. Lower the data encoding quality in a case that the statistical value is greater than the preset first congestion threshold.

The first congestion threshold is the lowest threshold. When the statistical value is in an interval between the first congestion threshold and the second congestion threshold, it indicates that the current network status is inadequate. Therefore, the data encoding quality may be lowered to a next lower grade (that is, the quality grade 1).

Certainly, the grade of lowering the data encoding quality may be alternatively adjusted adaptively, which specifically depends on a wireless network bandwidth corresponding to the interval between the first congestion threshold and the second congestion threshold.

702. Lower the data encoding quality to the lowest grade in a case that the statistical value is greater than a preset second congestion threshold.

When the statistical value is in the interval between the first congestion threshold and the second congestion threshold, it indicates that the current network status further deteriorates. In this case, to ensure a lowest level of data transmission, the data encoding quality may be adaptively lowered to the lowest grade, so as to ensure the data transmission.

703. Clear all to-be-sent data frames in a cache queue in a case that the statistical value is greater than the preset third congestion threshold.

The third congestion threshold is manually set, and can maintain the lowest value of a basic data transmission. When the statistical value is greater than the preset third congestion threshold, it is basically considered that the network status is a disconnected state or an extremely low-bandwidth state. Therefore, a strategy of clearing the cache queue may be adopted. The signal sending end actively clears the to-be-sent cached data, so as to rapidly output a current image data frame to the signal receiving end when the network recovers, thereby implementing a technical effect of rapid recovery.

Still referring to FIG. 3, the information receiving end 201 may specifically include the following hardware modules: a receiving module 211 and a display module 212. The receiving module 211 is a hardware module corresponding to the sending module 114, and may include a corresponding RF antenna configured to receive an RF signal from the sending module 114. Certainly, the receiving module 211 may further add or reduce some functional units according to requirements of actual cases. For example, the receiving module 211 may further include a decoding module, configured to: decode encoded content in the RF signal, and read image content included in the data frame.

The display module 212 may be a display device in the user terminal 20, and may receive image data and show the image data to the user. In this embodiment, the display module 212 is connected to the receiving module 211 to obtain decoding information provided by the receiving module 211, and displays the decoding information on the display device in the user terminal 20.

Figure 8:
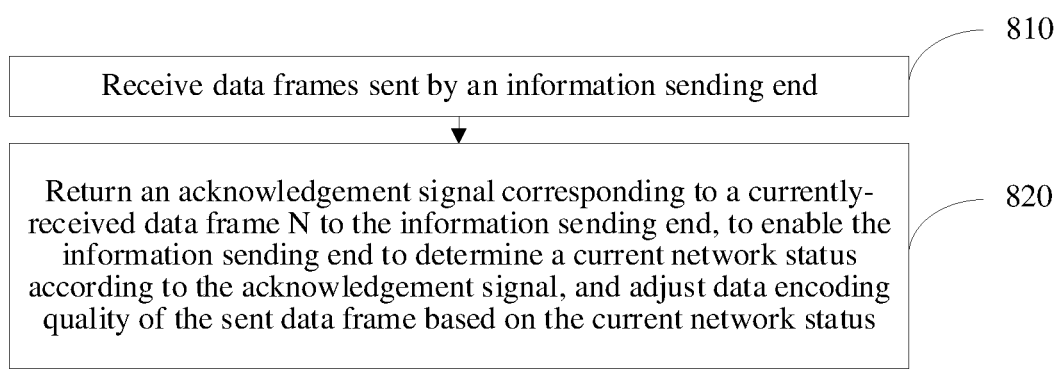
FIG. 8 is a method flowchart of a data transmission control method performed by an information receiving end according to an embodiment of the present invention.

Similar to the sending module 114, during the transmission of image data, the receiving module 211 may also adopt the method shown in FIG. 8 to adjust a decoding and playback strategy of the data frame in a timely manner according to the changes of the network status, so as to provide a better image display effect at the display module 212.

FIG. 8 shows a data transmission control method according to an embodiment of the present invention. The data transmission control method shown in FIG. 8 is applicable to an information receiving end of an aerial vehicle image transmission system. A person skilled in the art may understand that, based on the same inventive concept, the data transmission control method may further be applicable to other wireless transmission processes of data of other different types (for example, audio transmission), and is not limited to the aerial vehicle image transmission system.

As shown in FIG. 8, the data transmission control method includes the following steps.

810. Receive data frames sent by an information sending end.

In the information sending end 11, the data frames are sent in a particular order. When being sent, each data frame writes a sequence number used for representing a sending order of the data frame.

Therefore, the foregoing step 810 is a continuing step in the aerial vehicle image transmission system. Therefore, a data frame N is used to represent an $N^{th}$ data frame received by the information receiving end, N being a positive integer greater than 1.

820. Return an acknowledgement signal corresponding to a currently-received data frame N to the information sending end, to enable the information sending end to determine a current network status according to the acknowledgement signal, and adjust data encoding quality of the sent data frame based on the current network status.

After analyzing the received data frame N, the information receiving end may determine a sequence number n recorded by the data frame N, and write the sequence number n into the acknowledgement signal returned to the information sending end. In this case, an acknowledgement signal manner may be used to confirm for the information sending end that the data frame with a sequence number n is received. The signal sending end determines, according to the acknowledgement signal, whether the sent information is received, so as to estimate the network status.

Figure 9:
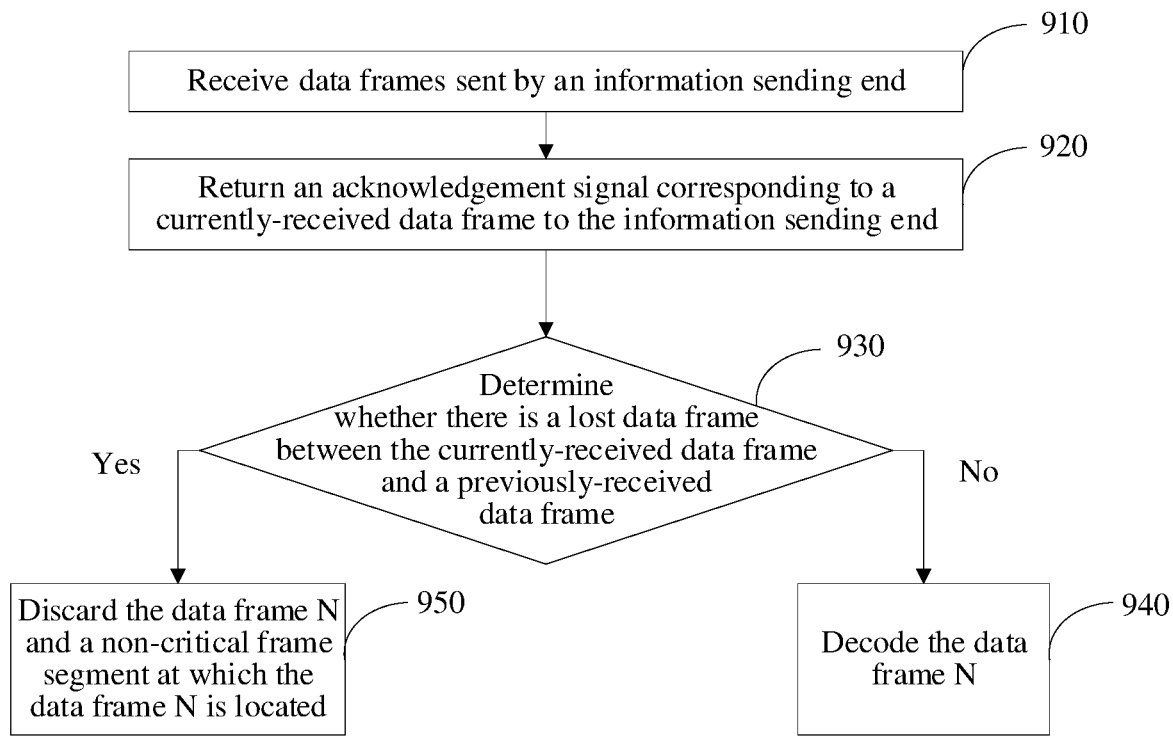
FIG. 9 is a method flowchart of a data transmission control method performed by an information receiving end according to another embodiment of the present invention.

FIG. 9 is a method flowchart of a data transmission control method according to another embodiment of the present invention. Based on the data transmission control method, a problem of screen corruption generated in the image transmission process may be effectively avoided. As shown in FIG. 9, in addition to step 910 and step 920 that are the same as step 810 and step 820 shown in FIG. 8, the method further includes the following steps.

930. Determine whether there is a lost data frame between the currently-received data frame N and a previously-received data frame N−1. Step 840 is performed in a case that there is a lost data frame between the currently-received data frame N and a previously-received data frame N−1; and step 850 is performed in a case that there is no lost data frame between the currently-received data frame N and a previously-received data frame N−1.

In a normal data transmission process, all the data frames sent by the information sending end are in fact not received by the information receiving end. Herein, the term "lost data frame" represents a data frame that is not received by the information receiving end. That is, the "packet loss" phenomenon occurs in the data transmission process.

940. Decode the data frame N.

When no frame is lost, it indicates that wireless network communication between the information receiving end and the information sending end at this time is in the normal state, and no special processing is required. The information receiving end may decode the data frame N and provide corresponding image data to the display module, and show the image data to the user.

850. Discard the data frame N and a non-critical frame segment at which the data frame N is located.

In a case that "packet loss" occurs or there is a lost data frame, there is obvious discontinuity between the data frame N and the data frame N−1 at this time. In a case that the received data frame N is still decoded and played, the problem of screen corruption is generated at the display module.

Therefore, a manner of discarding a non-critical frame located between critical frames may be adopted to directly play a next segment of image information from the next critical frame, so as to avoid the problem of screen corruption that occurs in the display module.

In this embodiment, the data frame sequence sent by the information sending end is formed by a plurality of spaced critical frames and consecutive non-critical frames. The consecutive non-critical frames between the critical frames form the critical frame segments.

It may be understood that, for any data frame N received by the signal receiving end, the data frame N may be inevitably located in one of the non-critical frame segments or exactly a critical frame. When the data frame N is a critical frame, the non-critical frame segment at which the data frame N is located is the non-critical frame segment after the critical frame.

In this embodiment, a time frequency of occurrence of the critical frame in the data frame sequence provided by the signal sending end should be improved as much as possible. The frequency of occurrence of the critical frame cannot be excessively low, and a time length of the non-critical segment should be less than the preset time threshold. Otherwise, when a packet loss phenomenon occurs, the image display (because there is a relatively large quantity of non-critical frames to be discarded) cannot be recovered rapidly. Preferably, the time frequency of occurrence of the critical frame may be set to 1 second (that is, one critical frame occurs at least every one second), so as to ensure that a time length of the non-critical segment is less than 1 second.

In some embodiments, based on a manner that the signal sending end sends the data frame and the signal receiving end returns the acknowledgement signal, it may be determined whether the sequence number of the currently-received data frame N and the sequence number of the previously-received data frame N−1 are consecutive to determine whether "packet loss" occurs or there is a lost data frame.

In a process of sending the data frame by the signal sending end, the sequence numbers are increased by frame in a sending order of the data frame sequence. That is, sequence numbers of two adjacent data frames sent by the signal sending end should be consecutive and different.

Therefore, in a case that the sequence numbers of the two adjacent data frame N and data frame N−1 that are received by the signal receiving end are consecutive, it may be determined that both of the two consecutive sent data frames are received, and there is no lost data frame or no packet loss phenomenon occurs. Otherwise, it indicates that the signal receiving end loses data frames with sequence numbers between the sequence numbers of the data frame N and data frame N−1, and a packet loss phenomenon occurs.

For example, when the sequence number of the data frame N is 5 and the sequence number of the data frame N−1 is 7, it indicates that a data frame whose sequence number is 6 is lost.

During actual transmission processing of data frames, a plurality of different forms may be adopted to accurately discard non-critical frame segment at which the data frame N is located. FIG. 9 is a method flowchart of discarding the non-critical frame segment provided in an embodiment of the present invention.

Figure 10:
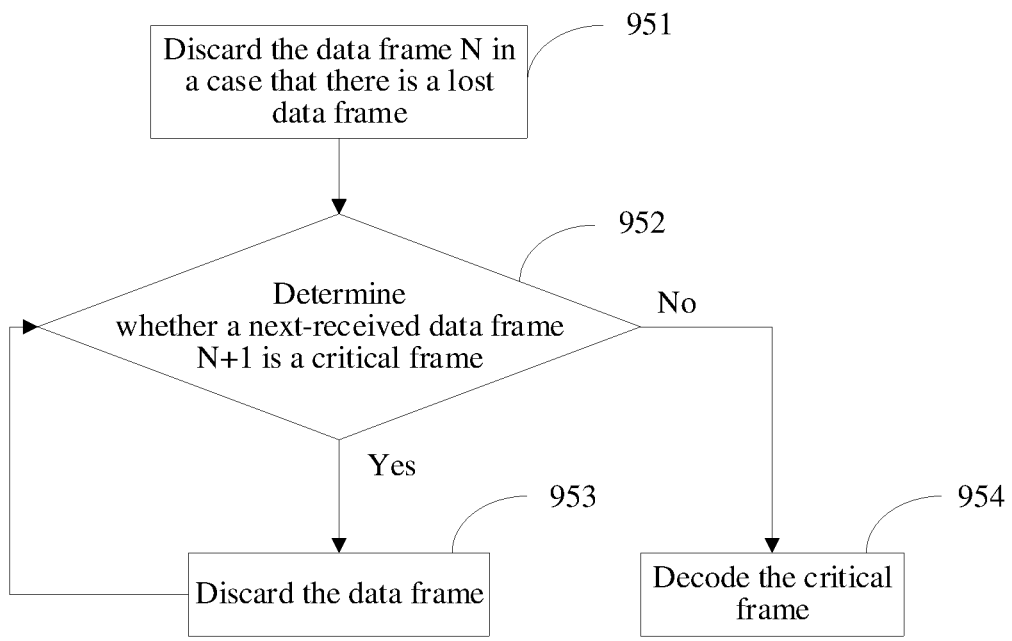
FIG. 10 is a method flowchart of step 950 shown in FIG. 9.

As shown in FIG. 10, the step of discarding the non-critical frame segment specifically includes the following steps.

951. Discard the data frame N in a case that there is a lost data frame.

The data frame N received at this time is discarded first when a packet loss phenomenon occurs.

952. Determine whether a next-received data frame N+1 is a critical frame. Step 953 is performed in a case that the data frame N+1 is a critical frame; and step 954 is performed in a case that the data frame N+1 is not a critical frame.

The critical frame is marked or labeled by the information sending end when the information sending end sends the data frame. The information sending end may adopt any form to label a part of the data frames in the data frame sequence, to determine that the data frames belong to the critical frames. Correspondingly, data frames that are not labeled are non-critical frames.

953. Decode the critical frame.

A process of decoding the critical frame may be determined in an encoding manner of the data frame. The information receiving end may adopt a variety of decoders to decode the critical frame. Image information obtained after the critical frame is decoded is provided to the display module, and the display module shows the image information to the user.

954. Discard the data frame.

As disclosed in the foregoing embodiments, the non-critical frame segment is formed through the division of two critical frames in the data frame sequence. Therefore, after the data frame N+1 is discarded, step 852 may be repeated, until a next critical frame is found, and the discarding the non-critical frame segment is completed.

Figure 11:
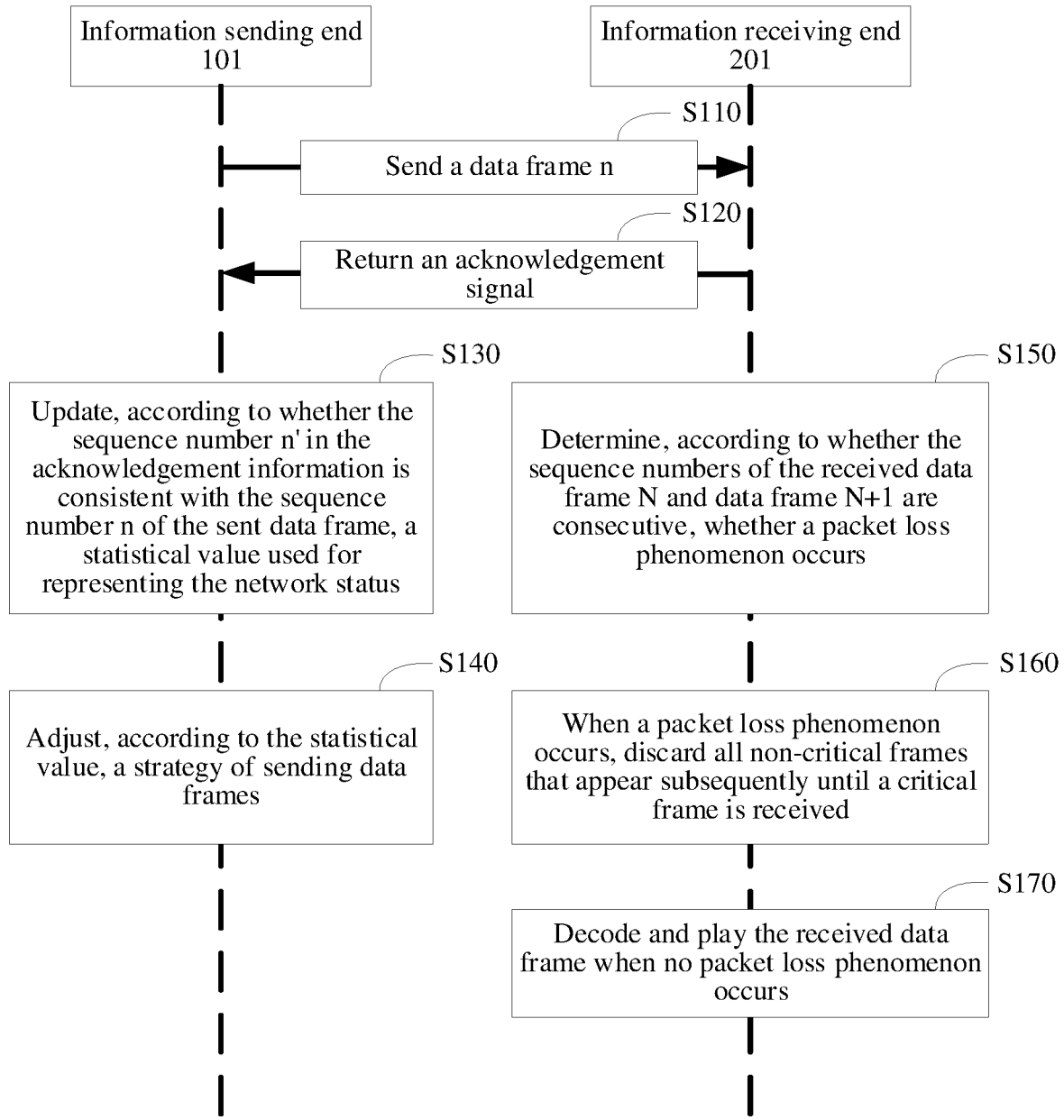
FIG. 11 is a flowchart of an image transmission process of the aerial vehicle image transmission system shown in FIG. 3.

FIG. 11 is a method flowchart of an image transmission process of the aerial vehicle image transmission system shown in FIG. 3. In an actual image transmission process, as shown in FIG. 11, in the transmission process, the information sending end 101 first sends a data frame n to the information receiving end 201 (S110), n being a sequence number of the data frame. Next, after receiving the data frame N, the information receiving end 201 returns a sequence number n' of the received data frame N to the information sending end 101 as an acknowledgement signal (S120).

In the information sending end 101, a statistical value used for representing the network status is updated according to whether the sequence number n' in the acknowledgement information is consistent with the sequence number n of the sent data frame (S130). Moreover, a strategy of sending data frames is adjusted according to the statistical value (S140).

For example, when the statistical value is greater than the third congestion threshold, all data frames in the cache sequence is cleared. Alternatively, the grade of the data encoding quality is adjusted according to the statistical value.

In the information receiving end 201, it is determined, according to whether the sequence numbers of the received data frame N and data frame N+1 are consecutive, whether a packet loss phenomenon occurs (S150). Moreover, when a packet loss phenomenon occurs, all non-critical frames that appear subsequently are discarded until a critical frame is received (S160), and the received data frame is decoded and played when no packet loss phenomenon occurs (S170).

In conclusion, the aerial vehicle image transmission system provided in the embodiments of the present invention adopts a strategy of discarding frames at an information receiving end. Therefore, the problem of screen corruption in a relatively poor network status and an excessively large image delay when the network recovers can be resolved effectively. However, the information sending end may identify a network status, adaptively adjust image quality according to the network status to ensure the output of images of low picture quality in a relatively poor network status, and rapidly recover images of high quality in a normal network status.

A person of ordinary skill in the art may further be aware that, in combination with examples of each step of the data transmission control method described in the embodiments disclosed in this specification, the present application may be implemented by using electronic hardware, computer software, or a combination thereof. To clearly describe interchangeability between the hardware and the software, compositions and steps of each example have been generally described according to functions in the foregoing descriptions. Whether these functions are implemented in hardware or software depends on the specific application and design constraints of the technical scheme.

Persons skilled in the art can use different methods to implement the described functions for each particular application, but it should not be considered that the implementation goes beyond the scope of the embodiments of the present disclosure. The computer software may be stored in a computer-readable storage medium. When the program is executed, the program may include the procedures of the embodiments of the foregoing methods. The storage medium may be a magnetic disk, an optical disc, a read-only memory, a random-access memory, or the like.

Finally, it should be noted that the foregoing embodiments are merely intended for describing the technical solutions of the present invention, but not for limiting the present invention. Under the thinking of the present invention, combinations may also be made between the technical characteristics in the above embodiments or in different embodiments, the steps may be implemented in any order, and there are many other variations in different aspects of the invention as described above, which are not provided in detail for simplicity. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present invention.

What is claimed is:

1. A data transmission control method, comprising:
   receiving data frames sent by an information sending end, the data frames being sequentially sent by the information sending end in an order of a data frame sequence, wherein the data frame sequence is divided into a plurality of non-critical segments by a plurality of critical frames;

returning an acknowledgement signal corresponding to a currently-received data frame N to the information sending end, to enable the information sending end to determine a current network status according to the acknowledgement signal and adjust data encoding quality of the sent data frame based on the current network status;

determining whether there is a lost data frame between the currently-received data frame N and a previously-received data frame N−1, N being a positive integer greater than 1;

in a case that there is no lost data frame, decoding the data frame N;

in a case that there is a lost data frame, discarding the data frame N and a non-critical frame segment at which the data frame N is located, comprising steps of:

discarding the data frame N in a case that there is a lost data frame;

determining whether a next-received data frame N+1 is a critical frame;

decoding, in a case that the data frame N+1 is a critical frame, the critical frame; and discarding the data frame N+1 in a case that the data frame N+1 is not a critical frame, and repeating the step of determining whether a next-received data frame is a critical frame.

2. The method according to claim 1, wherein a time length of the non-critical segment is less than a preset time threshold.

3. The method according to claim 1, wherein the data frame has a sequence number that increases by frame with a sending order; and the determining whether there is a lost data frame between the currently-received data frame N and a previously-received data frame N−1 specifically comprises:

determining whether sequence numbers of the currently-received data frame N and the previously-received data frame N−1 are consecutive;

determining, in a case that the sequence numbers are consecutive, that there is no lost data frame; and determining, in a case that the sequence numbers are not consecutive, that there is a lost data frame.

4. A data transmission control method, comprising:

sequentially sending data frames to an information receiving end in an order of a data frame sequence;

receiving an acknowledgement signal from the information receiving end;

determining a current network status according to the acknowledgement signal, comprising steps of: determining, within a preset time period, whether the acknowledgement signal is received after a data frame is sent; increasing a statistical value used for representing a network congestion degree in a case that the acknowledgement signal is not received; resetting or decreasing the statistical value in a case that the acknowledgement signal is received; and determining the current network status according to the statistical value; and adjusting data encoding quality of the sent data frame based on the current network status, comprising steps of: lowering the data encoding quality according to a size relationship between the statistical value and a preset congestion threshold in a case that the current network status is a congestion state; and stepwise recovering the data encoding quality in a case that the current network status is a normal state.

5. The method according to claim 4, wherein the data frame has a sequence number that increases by frame with a sending order; and the acknowledgement signal comprises a sequence number of the data frame received by the information receiving end; and the determining, within a preset time period, whether the acknowledgement signal is received after the data frame is sent comprises:

determining, within the preset time period, whether the acknowledgement signal is received after the data frame is sent;

determining, in a case that the acknowledgement signal is received, whether the sequence number comprised in the sent data frame is the same as the sequence number in the acknowledgement signal;

determining, in a case that the sequence number comprised in the sent data frame is the same as the sequence number in the acknowledgement signal, that the acknowledgement signal is received; and determining, in a case that the sequence number comprised in the sent data frame is different from the sequence number in the acknowledgement signal, that the acknowledgement signal is not received.

6. The method according to claim 5, wherein the preset time period comprises at least two receiving cycles.

7. The method according to claim 4, wherein the determining the current network status according to the statistical value specifically comprises:

determining, in a case that the statistical value is greater than the preset congestion threshold, that the network status is the congestion state; and determining, in a case that the statistical value is less than a preset normal threshold, that the network status is the normal state.

8. The method according to claim 4, wherein the lowering the data encoding quality in a case that the current network status is a congestion state specifically comprises:

lowering a grade of the data encoding quality in a case that the statistical value is greater than a preset first congestion threshold, the data encoding quality being divided into a plurality of grades.

9. The method according to claim 8, wherein the method further comprises:

lowering the data encoding quality to the lowest grade in a case that the statistical value is greater than a preset second congestion threshold, the second congestion threshold being greater than the first congestion threshold.

10. The method according to claim 9, wherein the method further comprises:

clearing non-critical segments in a cache queue, the non-critical segments being segments divided from the data frame sequence by the critical frame.

11. The method according to claim 9, wherein the method further comprises:

clearing all to-be-sent data frames in the cache queue in a case that the statistical value is greater than a preset third congestion threshold, the third congestion threshold being greater than the second congestion threshold.

12. The method according to claim 4, wherein the stepwise recovering the data encoding quality in a case that the current network status is a normal state specifically comprises:

calculating a count that the statistical value is consecutively less than the preset normal threshold; and improving the grade of the data encoding quality in a case that the count is greater than a preset count threshold, the data encoding quality being divided into a plurality of grades.

13. The method according to claim 12, wherein the method further comprises:
resetting the count after the grade of the data encoding quality is improved.

14. An information sending end, comprising a communication interface, a processor and a memory, the communication interface, the processor and the memory being coupled, wherein
the processor is configured to encode acquired image information, to form encoded information;
the memory at least comprises a data cache region and a software application (APP) storage region, the data cache region being used for caching the encoded information and forming a cache sequence, the software APP storage region storing a software APP; and
the processor calls the software APP to perform the data transmission control method according to claim 4 to send the encoded information to an information receiving end through the communication interface in a form of a data frame.

15. A data transmission control method, comprising:
sequentially sending data frames to an information receiving end in an order of a data frame sequence;
receiving an acknowledgement signal from the information receiving end;
determining a current network status according to the acknowledgement signal; and
adjusting data encoding quality of the sent data frame based on the current network status;
wherein the determining a current network status according to a receiving result of the corresponding acknowledgement signal comprises
increasing, in a case that the corresponding acknowledgement signal is not received, a statistical value used for representing a network congestion degree; and resetting or decreasing the statistical value in a case that the corresponding acknowledgement signal is received; and
determining the current network status according to the statistical value;
wherein the determining the current network status according to the statistical value specifically comprises determining, in a case that the statistical value is greater than a preset congestion threshold, that the network status is a congestion state; and
determining, in a case that the statistical value is less than a preset normal threshold, that the network status is a normal state;
wherein the adjusting data encoding quality of the sent data frame based on the current network status specifically comprises
lowering the data encoding quality in a case that the current network status is a congestion state; and
stepwise recovering the data encoding quality in a case that the current network status is a normal state;
wherein the stepwise recovering the data encoding quality in a case that the current network status is a normal state specifically comprises
calculating a count that the statistical value is consecutively less than the preset normal threshold; and
improving the grade of the data encoding quality in a case that the count is greater than a preset count threshold, the data encoding quality being divided into a plurality of grades.

16. The method according to claim 15, wherein the method further comprises:
resetting the count after the grade of the data encoding quality is improved.

17. An information sending end, comprising a communication interface, a processor and a memory, the communication interface, the processor and the memory being coupled, wherein
the processor is configured to encode acquired image information, to form encoded information;
the memory at least comprises a data cache region and a software application (APP) storage region, the data cache region being used for caching the encoded information and forming a cache sequence, the software APP storage region storing a software APP; and
the processor calls the software APP to perform the data transmission control method according to claim 15 to send the encoded information to an information receiving end through the communication interface in a form of a data frame.

* * * * *